United States Patent
Kennedy

(10) Patent No.: US 6,546,264 B1
(45) Date of Patent: Apr. 8, 2003

(54) HELMET HEADPHONES

(76) Inventor: Philip F. Kennedy, 5776 Peachtree St., Boise, ID (US) 83703

( * ) Notice: Subject to any disclaimer, the term of this patent is extended or adjusted under 35 U.S.C. 154(b) by 0 days.

(21) Appl. No.: 09/386,323

(22) Filed: Oct. 4, 1999

(51) Int. Cl.[7] .............................. H04B 1/38; H04M 1/00
(52) U.S. Cl. ........................................ 455/568; 379/430
(58) Field of Search ........................... 455/90, 575, 568, 455/351; 379/430; 381/376, 379, 370; 2/10

(56) References Cited

U.S. PATENT DOCUMENTS

| | | |
|---|---|---|
| 1,086,916 A | 2/1914 | Hutchison |
| 2,904,645 A | 9/1959 | Sarles |
| 3,148,376 A | 9/1964 | Aileo |
| 3,400,406 A | 9/1968 | Aileo |
| 3,430,261 A | 3/1969 | Benner |
| 4,152,553 A * | 5/1979 | White ........................ 179/156 |
| 4,259,747 A | 4/1981 | Taesler et al. |
| 4,620,068 A * | 10/1986 | Wieder ....................... 179/182 |
| 4,683,587 A * | 7/1987 | Silverman ..................... 381/25 |
| 4,756,028 A * | 7/1988 | Scanlon ....................... 370/430 |
| 5,142,700 A | 8/1992 | Reed |
| 5,257,420 A | 11/1993 | Byrne, Jr. |
| 5,438,702 A | 8/1995 | Jackson |
| 5,465,421 A | 11/1995 | McCormick et al. |
| 5,689,558 A * | 11/1997 | Osgood et al. ............. 379/430 |
| 5,691,514 A | 11/1997 | Landis |
| 5,970,155 A * | 10/1999 | Leppalahti ................... 381/72 |
| 6,065,157 A * | 5/2000 | Felman .......................... 2/209 |
| 6,069,964 A * | 5/2000 | Yang .......................... 381/374 |
| 6,085,357 A * | 7/2000 | Broersma ....................... 2/416 |
| 6,101,256 A * | 8/2000 | Steelman ..................... 381/91 |
| 6,301,367 B1 * | 11/2001 | Boyden et al. ............. 381/376 |

* cited by examiner

*Primary Examiner*—Vivian Chin
*Assistant Examiner*—Tu X Nguyen
(74) *Attorney, Agent, or Firm*—Stephen M. Nipper; Frank J. Dykas; Robert L. Shaver

(57) ABSTRACT

A headphone system for use with an existing protective sports helmet and connection with a portable sound producing device. The headphone system is attached to the exterior surface of the sports helmet and extends from the sides of the sports helmet rearwards around the back of the sports helmet and forward to the second side of the sports helmet. The headphone system is removably attachable to the sports helmet.

17 Claims, 5 Drawing Sheets

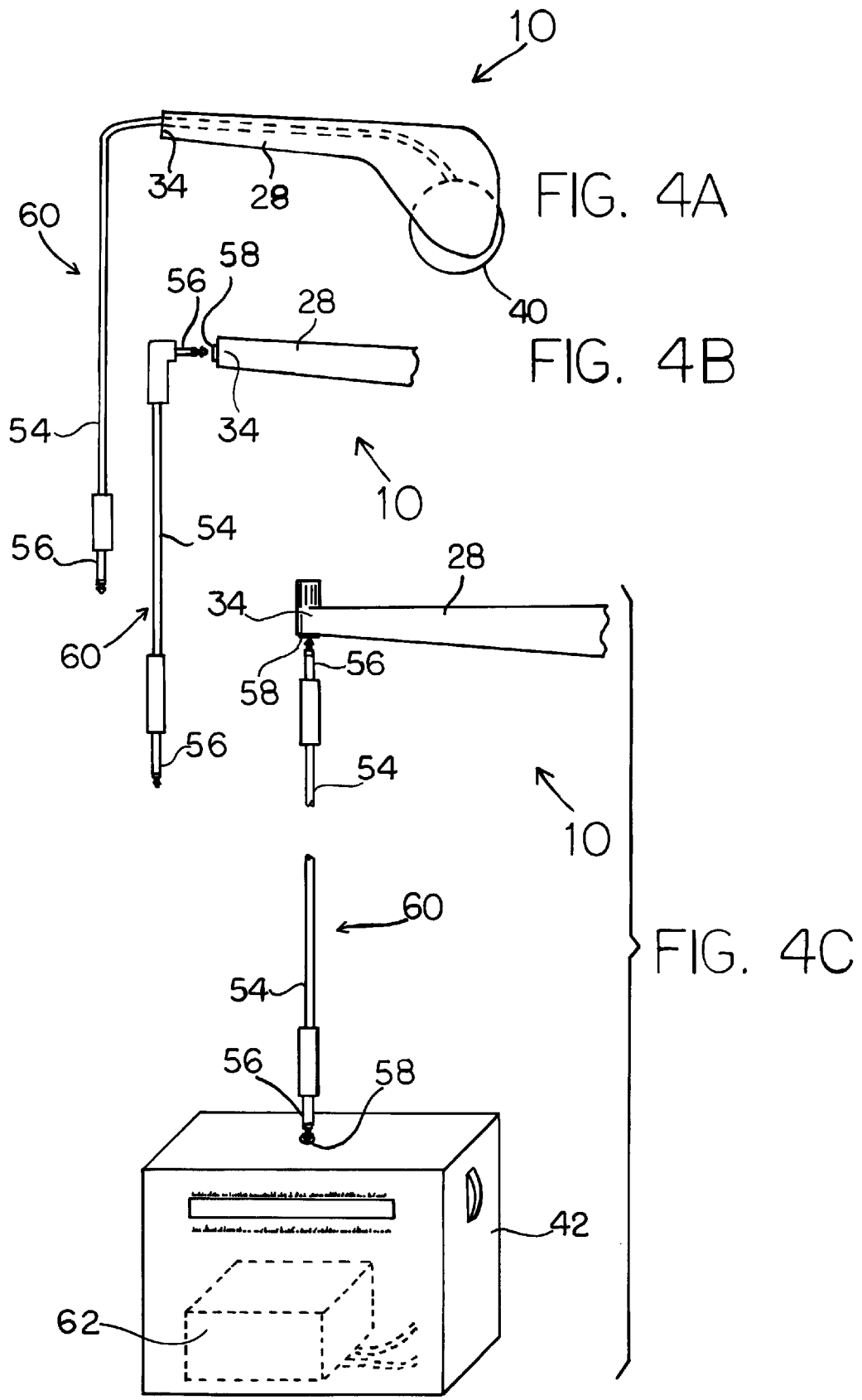

HELMET HEADPHONES

BACKGROUND OF THE INVENTION

1. Field of the Invention

The present invention generally relates to protective headgear for sports activities, and more specifically to headphone systems for use with such protective headgear.

2. Background Information

Outdoor mobile recreation, whether it be by bicycle, in-line skates or other means, is an increasingly popular recreation. Many times these recreations, for reasons of safety, necessitate the wearing of a protective helmet or headgear.

Many people, when doing such activities, prefer to listen to music, however, these people often find that traditional helmets are not compatible with traditional audio headphone systems. For instance, most headphone systems are designed to extend over the top of a wearer's head, a relative impossibility when the wearer is wearing a helmet.

There are many patented devices showing the use of protective head gear and speakers. For instance, U.S. Pat. No. 1,085,916 to Hutchison discloses an intercommunicating telephonic apparatus. Essentially, Hutchison shows a headphone system with microphone that attaches to a cap. The Hutchison device wraps around the front and back of the cap.

U.S. Pat. No. 2,904,645 to Sarles discloses a helmet radio, including a transistor amplifier. However, the Sarles device is designed to go inside of a helmet, and appears to be integrally attached to the helmet.

Another patent is U.S. Pat. No. 3,148,376 to Aileo which discloses a support for a head engaging device. The Aileo device is integral with the helmet, and the attachment band of this device extends over the crown of the head.

U.S. Pat. No. 3,400,406 to Aileo discloses a positioning means for sound attenuating ear cups on safety helmets. This headphone system is integrated into the helmet as well.

U.S. Pat. No. 3,430,261 to Benner discloses a sound attenuator attachment for a protective helmet. The Benner device is a set of sound attenuating ear pieces attached to the side of a helmet which are able to swing upwards and downwards to protect the ears.

U.S. Pat. No. 4,259,747 to Taesler discloses a protective communications helmet. The headphone system in Taesler extends from what appears to be the nape of the neck upwards towards the ears. The Taesler device appears to be integral with the helmet itself as well.

Another patent, U.S. Pat. No. 5,142,700 to Reed discloses a protective helmet containing an integral transceiver. The Reed device is a transceiver system located inside the helmet.

Another patent is U.S. Pat. No. 5,257,420 to Byrne, Jr. Byrne, Jr. discloses earmuffs for use with headphones. These earmuffs snap on to a pre-existing set of headphones.

U.S. Pat. No. 5,438,702 to Jackson discloses a bicycle helmet communication device. The Jackson device includes a helmet and attaches to the side of this helmet.

U.S. Pat. No. 5,465,421 to McCormick et al., discloses a protective sports helmet with speakers, helmet retrofit kit and method. The McCormick device is made from components which are separately installed inside the helmet.

Finally, U.S. Pat. No. 5,691,514 to Landis discloses a rearward sound enhancing apparatus. The Landis device comprises a headphone set strung across the top of a wearer's head inside a helmet. This headphone set then is connected to a microphone for enhancing rearward sounds.

Accordingly, what is needed is a headphone system which can be added by a user to an existing sports safety helmet, wherein this headphone system extends from the area next to the user's first ear around the back of the user's head, and to the user's other ear. This keeps the headphone completely out of the way of the user. The headphone system would preferably be able to be affixed to the helmet so that the user can remove the helmet and put the helmet back on without having to remove or readjust the headphone system itself. The headphone system should also be removably attached to the helmet. The headphone system should have either a built-in sound signal producing device or be able to easily electronically join to one carried by or on the user. The speakers themselves should be able to be pivoted away from the user's ears, so that the user may hear better in certain conditions, such as when in traffic or when talking to another individual. The present invention solves these needs.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

These objects are achieved in a headphone system in which the invented headphone system comprises a C-shaped band which resiliently fits the helmet. Attachment is assisted through an attachment means, such as snaps or Velcro®, for securely holding the band on the exterior surface of the helmet. Extending from the ends of this C-shaped band are support means for support of and positioning of speakers. These ends and support means hold the speakers generally near the user's ears so that the user may hear music or other sounds emanating therefrom. The headphone system either has a built-in sound producing device, such as a radio, or is able to connect electrically with a sound producing device. This sound producing device can be either battery or other powered, including solar means. Volume and other controls may also be located on the head band or support means for allowing the user to, for instance, increase volume or switch between connected devices. Preferably, the speakers will be able to be pivoted, rotated or slid out of the way, so that the user may move the speaker away from his or her ear, thereby enabling the user to better hear the traffic, or to have a conversation with another person. In the embodiments in which the sound producing device is not integrated into the headphone system, the sound producing device may be carried or worn by the user of the system. In such a case, an electrical connection will need to be made between the headphone system and the sound producing device. In the preferred embodiment, the electrical connection will extend out of the center section of the band, which will be attached to the rear of the helmet as worn, so that the cord does not interfere with the wearer's activities. In such a case, the electrical connection may be wiring that would extend down from the back of the helmet out of the band center section down the back of the wearer and terminating in a plug which is inserted into a receptacle in the sound-producing device. There are miscellaneous plugs and electrical connections/wires that can be made to achieve this purpose. Other embodiments include the use of ear warmers to keep the wearer's ears warm, and the inclusion of a microphone allowing the wearer to communicate, either by mobile radio or other device, with other individuals.

In use, the headphone system is affixed to the exterior surface of an existing sports protective helmet through use of the attachment means. Such attachment is done toward the center section of the band at a location near the rear of the helmet. The ends of the band are respectively located on the sides of the helmet near the location of the user's ears if the user was wearing the helmet. If the sound producing device is not integrated into the helmet, then the user would have to electrically connect the headphone system to the sound producing device. Then, when the sound producing device is turned on, sound will be emitted from the speakers and the user will be able to hear the sound. It is preferred that the attachment means allow for quick and easy removal of the headphone set from the helmet. This allows the wearer to choose whether or not to wear the headphone system with the helmet.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

BRIEF DESCRIPTION OF THE DRAWINGS

FIG. 4A is a partial side view of an embodiment showing wiring extending directly out of the center section of the invention.

FIG. 4B is a partial side view showing the wiring's attachment to the center section of the device through use of a right angled jack.

FIG. 4C is a partial side view showing another embodiment of a wiring connection.

DESCRIPTION OF THE PREFERRED EMBODIMENTS

Figure 1:
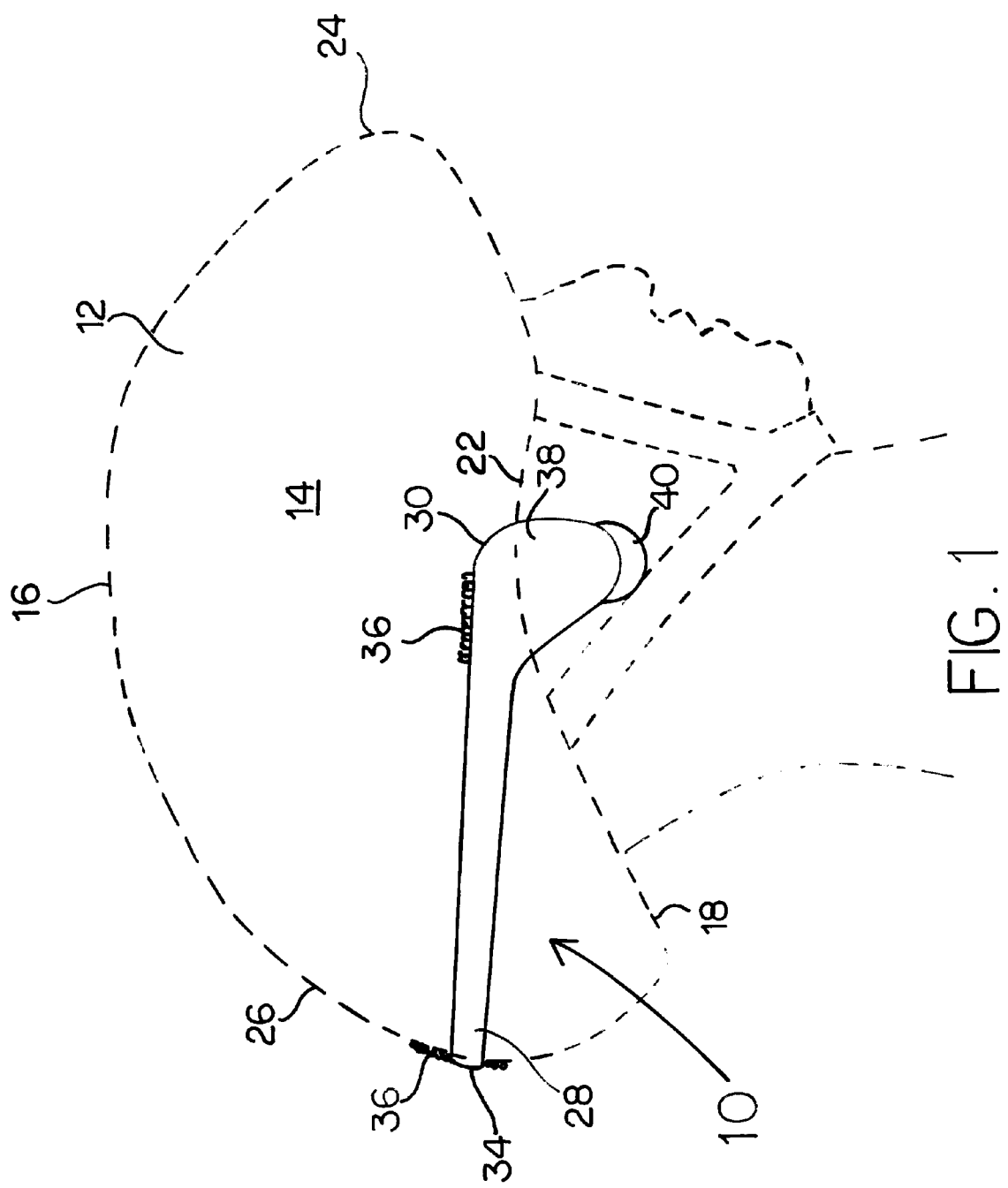
FIG. 1 is an environmental view of an apparatus in accordance with the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Referring to FIG. 1, there is shown an external headphone system for attachment to a standard protective sports helmet in accordance with the present invention. The headphone system 10 includes a C-shaped attachment band 28 extending from a first end 30 and curving through a center section 34 and back towards a second end 32 (not shown).

The standard sports helmet 12 to which the present invention is attached when in use comprises an exterior surface 14 having a crown 16 and a rim 18. The helmet 12 has a left side ear notch (not shown) in said rim 18, and a right side ear notch 22 in said rim 18. The helmet 12 further has a front side 24 and a rear side 26. The preferred helmet used is any sports helmet used for the protection of a bicycler, skateboarder, in-line skater or other sports enthusiast's head.

Figure 2:
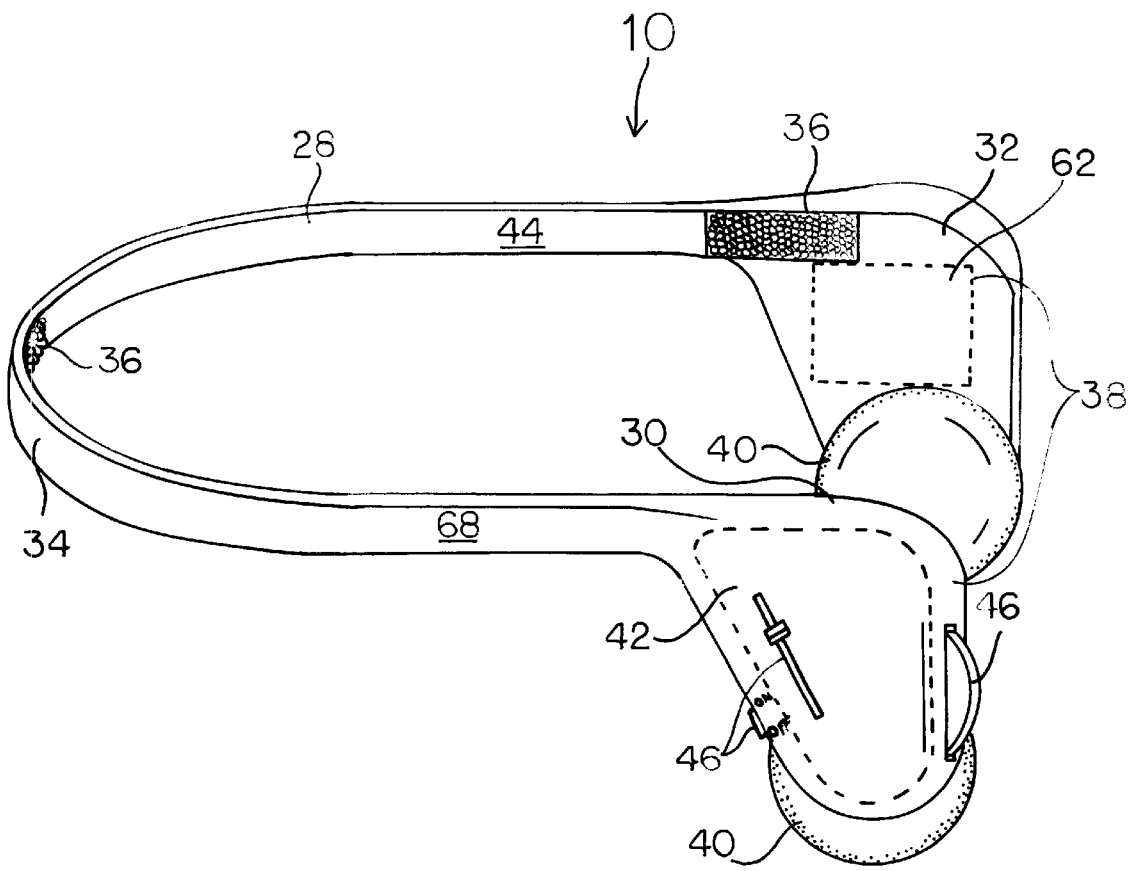
FIG. 2 is a perspective view of the apparatus shown in FIG. 1.

Referring now to FIG. 2, attaching to the ends 30, 32 of the headphone system 10 are support means 38 for support and positioning of audio speakers 40. In such an arrangement, each of the support means 38 holds in position a speaker 40 in the general vicinity of a user's ear, directed towards the user's ears.

The present invention further comprises attachment means 36 for attaching the attachment band 28 to the helmet 12 exterior surface 14, as shown in FIG. 1. This is done with the C-shaped band wrapping from the first end 30 positioned near the right side of ear notch 22 around the back 26 of the helmet to the second end 32 positioned near the left side of ear notch. It is envisioned that the band 28 be resilient thereby allowing it to accommodate various helmet sizes and shapes. The attachment means 36 can be any means of attaching the bands 28 to the helmet 12, but in the preferred embodiment the attachment means 36 comprises Velcro® fasteners attached to the interior surface 44 of the band 28 and the exterior surface 14 of the helmet.

The preferred embodiment comprises the use of three separate attachment points, one located near the left side ear notch, one located near the right side ear notch 22, and one located near the rear side 26 of the helmet outer surface 14. Any attachment means placement on the exterior surface 14 of the helmet would be operable so long as the attachment band 28 can be securely held so that the attached audio speakers 40 can be held near the user's ears. As such, the first 30 and second 32 ends respectively, are positioned adjacent to said right ear notches 22 and left ear notches in said helmet rim 28, and the center section 34 is positioned adjacent to the helmet's rim 18 at the rear side 26 of the helmet 12.

Figure 3A:
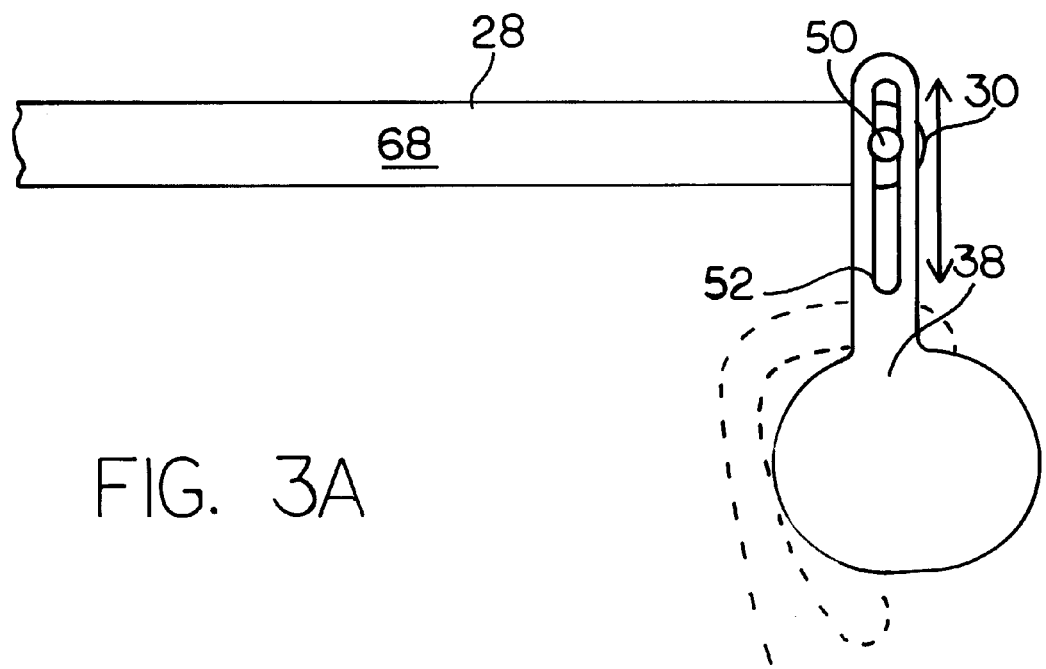
FIG. 3A is a side view of one embodiment of the apparatus showing a sliding embodiment of the support means.
Figure 3B:
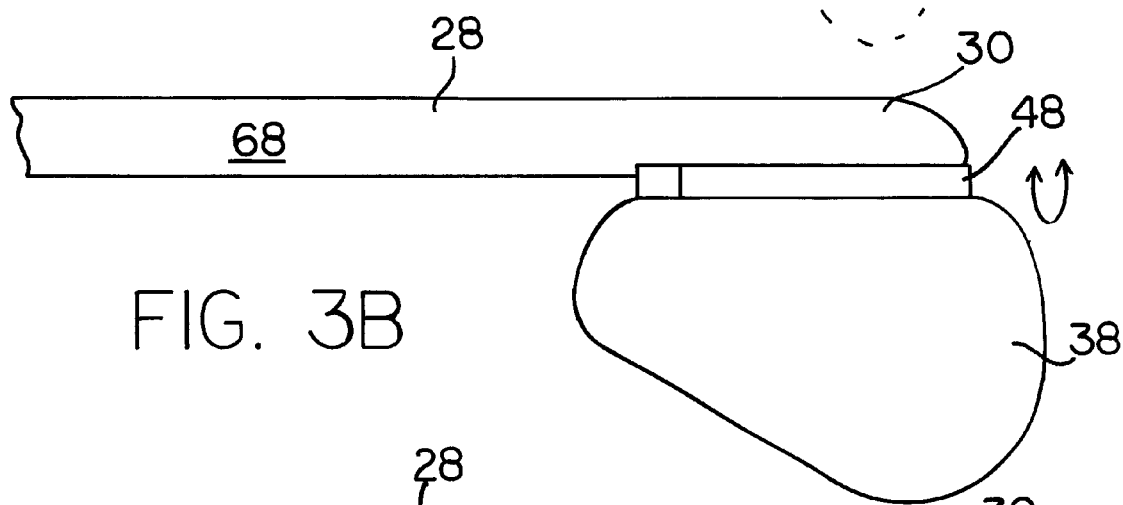
FIG. 3B is a side view of the support means of another embodiment showing a hinged attachment of the support means.
Figure 3C:
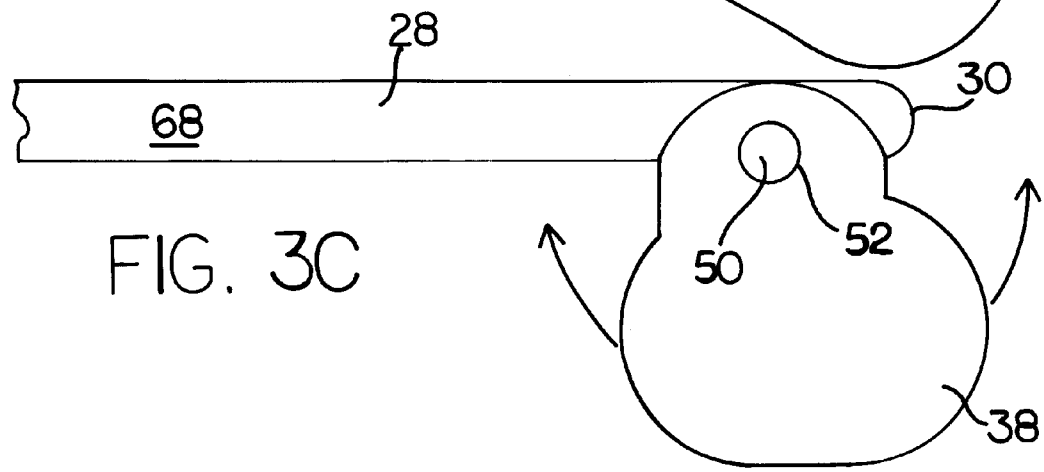
FIG. 3C is a side view of another embodiment of a support means.

As shown in FIGS. 3A, 3B and 3C, embodiments of the support means 38 can be attached to the band 28 in a variety of ways, other than the rigid attachment shown in FIG. 1. FIG. 3A shows an attachment allowing for upward or downward movement of the support means 38 relative to the band 28. In this embodiment a small pin 50 is located on the outer surface 68 near the first end 30 of the band. This pin 50 is received into a pin hole 52 located within the support means 38. This allows the support means 38 to be pivoted or slid upwards or downwards. Any such other sliding attachment would also work with this application. This allows the user to slide the support means 38 which is attached to the speakers 40, thereby sliding the speakers 40 upwards and away from the user's ears. This permits the user to have unobstructed hearing when in a location with which his or her hearing must be unimpaired, such as while riding a bicycle in traffic. Another pin 50, would be located on the second end 32 (now shown) and a likewise attachment would be present.

FIG. 3B shows another embodiment. In this embodiment, a hinge 48 is used to allow the support means 38 to pivot outwards and upwards away from the ear, or downwards and inwards toward the ear. This hinge 48 attaches preferably near the first end 30 of the bands 28, and attaches the support means 38 to the band 28. Any other means of hinged or pivotal movement would also be appropriate. Another hinge 48, would be located on the second end 32 (now shown) and a likewise attachment would be present.

Another embodiment is shown in FIG. 3C which discloses a rotatable attachment. In this embodiment, a pin 50 is located near the first end 30 of the band 28. The support means 38 has a pin hole 52 for receiving said pin 50. When so attached, the support means is allowed to pivot towards the front side 24 of the device when installed on the helmet 12, or towards the rear side 26 of the device when installed on the helmet. All other rotatable attachment means are also envisioned. Another pin 50, would be located on the second end 32 (now shown) and a likewise attachment would be present.

Referring now to FIGS. 4A–4C, it is envisioned that the audio speakers 40 will be electrically connected to a portable sound producing device 42. The portable sound producing device 42 will generate an audio signal and will transmit that audio signal to the speakers 40. There will be an electrical connection 60 between the audio speakers 40 and the portable sound producing device 42, and the portable sound producing device 42 will be powered by a power source 62. It is also envisioned that the portable sound signal producing device 42 may be built within the attachment band, as shown in FIG. 2.

The portable sound signal producing device 42 can be a radio frequency receiver, a CD player, or any other type of similar audio electronic device. Referring again to FIGS. 4A–4C, in embodiments where the portable sound signal producing device 42 is not built into the attachment band, the electrical connection 60 will extend preferably out of the center section 34 of the headphone set or system 10 and downwards to the portable sound producing device 42 being worn or held by the user. In the preferred embodiment, the electrical connection 60 further comprises wiring 54 extending to a plug 56 for insertion and electrical connection with a jack 58 located in the portable sound producing device 42. Another embodiment, as shown in FIG. 4B, includes the use of a jack 58 built within the center section 34 of the band 28. In this embodiment, the wiring 54 would have a plug 56 located at both of its ends. Another embodiment of such an arrangement is shown in FIG. 4C.

Referring back to FIG. 2, where the headphone system 10 includes an integrated portable sound producing device 42, various controls 46 for controlling the power, the volume, the tuning, or any other controls may be located within the band 44 or, the support means 38 of the band 44. It is also envisioned that in such an embodiment the power source 62 will be located within or upon the band 28. Such power source 62 may include batteries or a solar power source located on the surface of the headphone system 10 itself. The power source 12 may be located within one support means 38, while the sound producing device 42 could be located in the other.

The electrical circuitry and components comprising the portable sound producing device are those obvious as necessary by those skilled in the art. Generally, the portable sound-producing device 42 will be powered by power source 62, such as a battery. This portable sound-producing device will produce an audio signal which will be transmitted by the electrical connection 60 to each one of the speakers 40. These speakers will then transmit or convert this audio signal into audio waves to be heard by a wearer.

In use, the headphone system 10 is attached using the attachment means 36 to the external surface 14 of the sports helmet 12. Such attachment is done so that the audio speakers 40 are in the vicinity of the user's ears, so that the user will be able to hear audio generated by the headphone system 10. It is preferred that such attachment means 36 be able to be easily detached, thereby allowing the user to attach/detach the headphone system 10 from the sports helmet 12 when the headphone system 10 is not in use.

Figure 5:
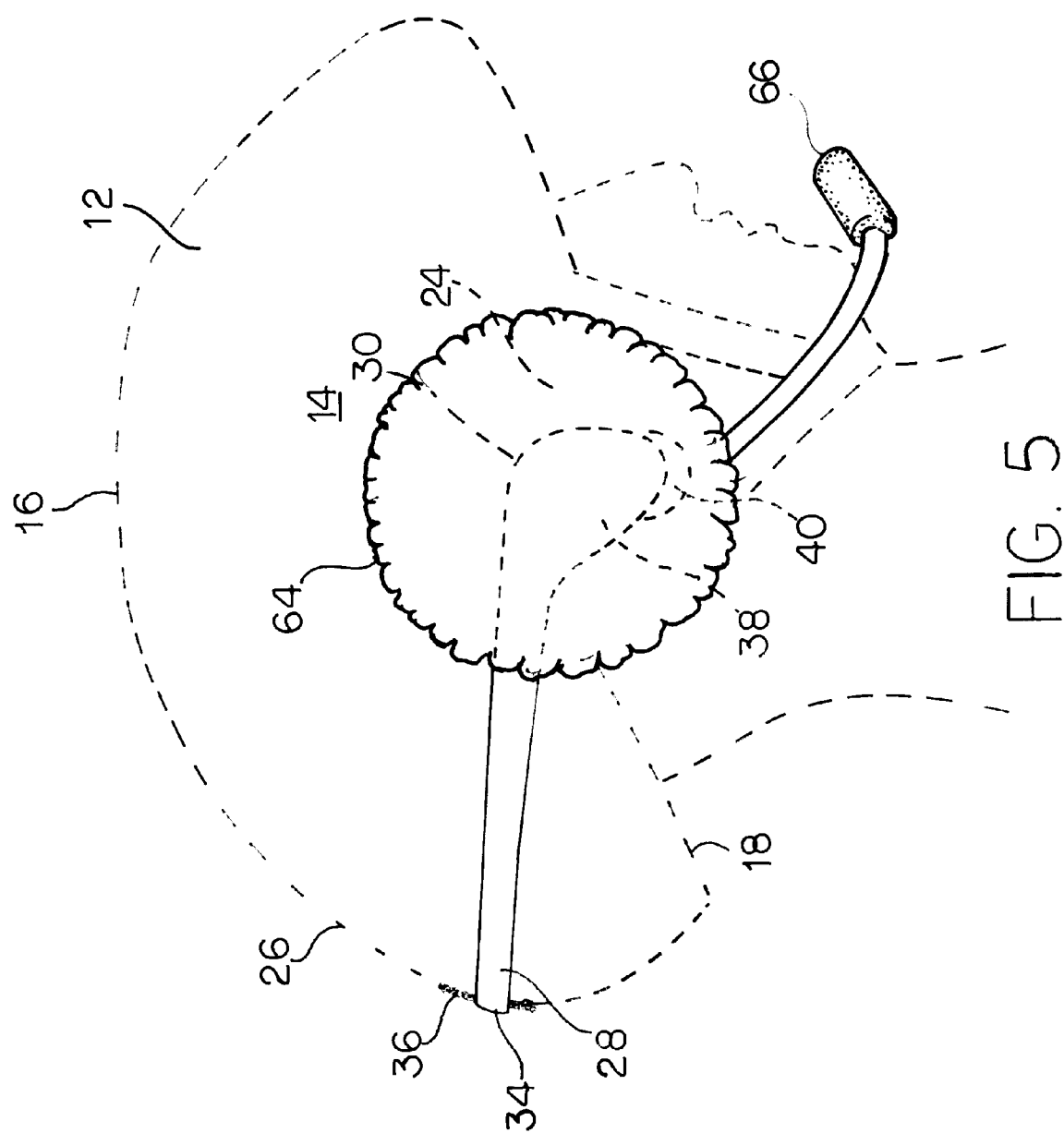
FIG. 5 shows a side view of another embodiment of the present invention.

It is also envisioned that the support means 38 will further comprise a set of earwarmers 64, as shown in FIG. 5, said ear warmers 64 for keeping a wearer's ears warm when the weather outside is cold.

It is also envisioned that the system will be water resistant, thereby allowing the user to operate said device in the rain or other circumstances where the system 10 may become wet.

Also shown in FIG. 5, is also envisioned that the headphone system 10 may comprise a microphone 66. This microphone 66 can be located anywhere on the headphone system and would allow the user to communicate with another person if the portable sound producing device 42 is a radio transceiver, mobile radio, cellular phone, or other device.

The electrical connection may further comprise controls 46 for switching between multiple portable sound producing devices. For instance, switching between the radio frequency receiver built in to the band 28 and a cassette tape carrier being carried by the wearer on the wearer's body and electrically connected to the band 28 through an electrical connection 60.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. An external headphone system for use with a sports helmet, said sports helmet having an exterior surface with a crown and a rim, a left side ear notch in said rim, a right side ear notch in said rim, a front side and a rear side, said headphone system comprising:

a C-shaped attachment band for attaching to said sports helmet, said attachment band further comprising a first end, a second end, and a center section, with said first and second ends respectively positioned adjacent said right and left ear notches in said helmet rim, and said center section positioned adjacent said helmet rim, at said rear side;

attachment means for attaching said attachment band to said helmet's exterior surface so that said first end is located near the right side ear notch of the sports helmet rim, so said center section is attached to said exterior surface at said rear side of said helmet, and so that said second end is located near the left side ear notch in said helmet rim;

support means attached to and extending from said first and second ends of said C-shaped attachment band, for supporting and positioning an audio speaker;

an audio speaker attached to each of said support means;

a portable sound signal producing device, for generating an audio signal for transmission to said audio speaker;

an electrical connection connecting said audio speakers to said portable sound signal producing device; and a power source connected with said portable sound signal producing device for powering said portable sound signal producing device.

2. An external headphone system, as in claim 1, wherein said portable sound signal producing device is built into said attachment band.

3. An external headphone system, as in claim 2, wherein said portable sound signal producing device is a radio frequency receiver.

4. An external headphone system, as in claim 1, wherein said electrical connection further comprises a jack located at the center section of the attachment band for electrical connection with a plug which connects with the portable sound signal producing device.

5. An external headphone system, as in claim 1, wherein said electrical connection further comprises wiring extending from the center section of the attachment band and plug for electrical connection with said portable sound signal producing device to a jack.

6. An external headphone system, as in claim 1, wherein the electrical connection further comprises controls for switching between multiple portable sound signal producing devices.

7. An external headphone system, as in claim 2, wherein the power source comprises at least one solar cell.

8. An external headphone system, as in claim 2, wherein the power source is at least one battery.

9. An external headphone system, as in claim 1, wherein said system is water resistant.

10. An external headphone system, as in claim 1, wherein said portable sound signal producing device further comprises a microphone.

11. An external headphone system, as in claim 1, wherein said support means enables said speakers to slide upwards and downwards.

12. An external headphone system, as in claim 1, wherein said support means enables said speakers to pivot upwards and downwards.

13. An external headphone system, as in claim 1, wherein said support means further comprises ear warmers.

14. An external headphone system, as in claim 1, wherein said attachment means allows said system to be detachable from said helmet.

15. An external headphone system, as in claim 14, wherein said attachment means allows said system to be retachable to said helmet.

16. A headphone system for use with a sports helmet, said sports helmet having an exterior surface with a crown and a rim, a left side ear notch in said rim, a right side ear notch in said rim, a front side and a rear side, said headphone system comprising:

a C-shaped attachment band for removable attachment to said sports helmet, said attachment band further comprising a first end, a second end, and a center section, with said first and second ends respectively positioned adjacent said right and left ear notches in said helmet rim, and said center section positioned adjacent said helmet rim, at said rear side;

an attachment means for removably attaching said attachment band to said helmet's exterior surface so that said first end is located near the right side ear notch of the sports helmet rim, so said center section is attached to said exterior surface at said rear side of said helmet, and so that said second end is located at the left side ear notch in said helmet rim;

pivotal support means attached to and extending from said first and second ends of said C-shaped attachment band, for supporting and positioning an audio speaker, said support means extending downwards from the ends of said band;

an audio speaker attached to each of said support means;

a portable sound signal producing device, for generating an audio signal for transmission to said audio speaker, wherein said portable sound signal producing device is built into said attachment band;

an electrical connection connecting said audio speakers to said portable sound signal producing device; and a power source for powering said portable sound signal producing device, said power source connected to said sound signal producing device, wherein said power source is built into said attachment band.

17. A headphone system for use with a sports helmet, said sports helmet having an exterior surface with a crown and a rim, a left side ear notch in said rim, a right side ear notch in said rim, a front side and a rear side, said headphone system comprising:

a C-shaped attachment band for attachment to said sports helmet, said attachment band further comprising a first end, a second end, and a center section, with said first and second ends respectively positioned adjacent said right and left ear notches in said helmet rim, and said center section positioned adjacent said helmet rim, at said rear side;

an attachment means for attaching said attachment band to said helmet's exterior surface so that said first end is located near the right side ear notch of the sports helmet rim, so said center section is attached to said exterior surface at said rear side of said helmet, and so that said second end is located near the left side ear notch in said helmet rim;

pivotal support means attached to and extending from said first and second ends of said C-shaped attachment band, for supporting and positioning an audio speaker, said support means extending downwards from the ends of said band;

an audio speaker attached to each of said support means;

an electrical connection connecting said audio speakers to a portable sound signal producing device, wherein said portable sound signal device generates an audio signal for transmission to said audio speaker, wherein said electrical connection comprises at least one wire electrically connecting to each speaker, said wires extending through the attachment band to the center section of the attachment band, wherein the wires thereupon extend out of the attachment band for a length, said wires terminating in a plug able to be is inserted into the a jack in the portable sound signal producing device; and a power source connecting to said sound signal producing device for powering said portable sound signal producing device.

* * * * *